United States Patent
Parent et al.

(10) Patent No.: US 9,938,001 B1
(45) Date of Patent: Apr. 10, 2018

(54) UNMANNED AERIAL VEHICLE (UAV) DEPLOYMENT OF PASSIVE CONTROL STABILIZERS

(71) Applicant: Amazon Technologies, Inc., Seattle, WA (US)

(72) Inventors: Gershon Parent, Seattle, WA (US); Paul Viola, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 14/868,156

(22) Filed: Sep. 28, 2015

(51) Int. Cl.
*B64C 39/02* (2006.01)
*B64C 13/16* (2006.01)

(52) U.S. Cl.
CPC .......... *B64C 13/16* (2013.01); *B64C 39/024* (2013.01); *B64C 2201/108* (2013.01); *B64C 2201/141* (2013.01)

(58) Field of Classification Search
None
See application file for complete search history.

(56) References Cited

U.S. PATENT DOCUMENTS

| | | | |
|---|---|---|---|
| 8,205,822 B1* | 6/2012 | Jameson | B64C 39/024 244/137.4 |
| 9,421,869 B1* | 8/2016 | Ananthanarayanan | B60L 5/005 |
| 2007/0034738 A1* | 2/2007 | Sanders, Jr. | B64C 27/12 244/23 A |
| 2013/0338856 A1* | 12/2013 | Yelland | G05D 1/0088 701/2 |
| 2017/0073065 A1* | 3/2017 | Von Novak | B64C 27/08 |

\* cited by examiner

*Primary Examiner* — Thomas G Black
*Assistant Examiner* — Demetra R Smith-Stewart
(74) *Attorney, Agent, or Firm* — Lee & Hayes, PLLC

(57) ABSTRACT

A passive control system can be implemented that converts an active control system on a multi-rotor unmanned aerial vehicle (UAV) to a passive control system. In the event that a system health of an active control system on the UAV is compromised, or in other instances, a passive control mechanism can be deployed to restore at least some in-flight stability. In various examples, the passive control system can monitor UAV attitude, velocity, and position to determine an active control system health. In other examples, the passive control system may receive an indication from the active control system itself. In some examples, the passive control mechanisms may include increasing an offset of a center of thrust and the center of gravity of the UAV. In other examples, the passive control mechanisms may include deploying control surfaces that induce a drag force that impedes translational and rotational movement.

20 Claims, 14 Drawing Sheets

(Section A-A)

(Section B-B)

UNMANNED AERIAL VEHICLE (UAV) DEPLOYMENT OF PASSIVE CONTROL STABILIZERS

BACKGROUND

Unmanned aerial vehicles (UAVs) can provide a flexible, maneuverable, and compact solution to aerial transportation. By design, UAVs can employ an active control system that continuously monitors and adjusts motors and control surfaces to maintain in-flight stability. However, actively controlled UAVs can be inherently unstable, and a compromised system health condition of an active control system can lead to catastrophic failure of the UAV.

Many conventional aircraft are designed to employ a passive control system that creates stability of the aircraft during flight without need for continuous controls. A passively controlled aircraft does not require the continuous monitoring and adjustment of motors and control surfaces to maintain in-flight-stability. Instead, control surfaces and other geometries can be used to naturally adjust an orientation and maintain in-flight stability. However, passively controlled aircraft have some drawbacks. By design, the inclusion of control surfaces and other geometries to naturally maintain in-flight stability means that a passively controlled aircraft is likely to be less maneuverable and less compact than its actively controlled counterpart is.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 further illustrates a deployment of one or more control surfaces that provide at least some lateral stability, and an offset of some UAV structure downward to provide at least some pendulum stability.

FIG. 4A illustrates a plan view of a UAV and a plurality of control surface masts in a stowed position.

FIG. 6A illustrates an example environment whereby a central controller interacts with a passive control system on a UAV.

DETAILED DESCRIPTION

This disclosure provides a control system that causes an unmanned aerial vehicle (UAV) to deploy passive control mechanisms. In the event that an active control system of the UAV experiences a compromised system health condition, a passive control system can implement one or more passive control mechanisms that can restore at least some in-flight passive stability and controllability. In some examples, the passive control mechanisms may provide enough stability and controllability for a UAV to safely execute a priority landing or travel to a nearby landing site. In other examples, the passive control mechanisms may provide enough stability and controllability to complete a current delivery or task.

In various examples, a passive control system may continuously monitor in-flight data of a UAV to detect a compromised system health condition of an active control system. In some examples, a compromised system health condition may include irregular sensor data from one or more sensor types, a loss of sensor data from one or more sensor types, or a complete active control system failure. Further, the in-flight data may include UAV attitude, velocity, and position. In other examples, the passive control system may additionally, or alternatively, receive an indication from the active control system of a compromised active control system health condition.

Figure 1:
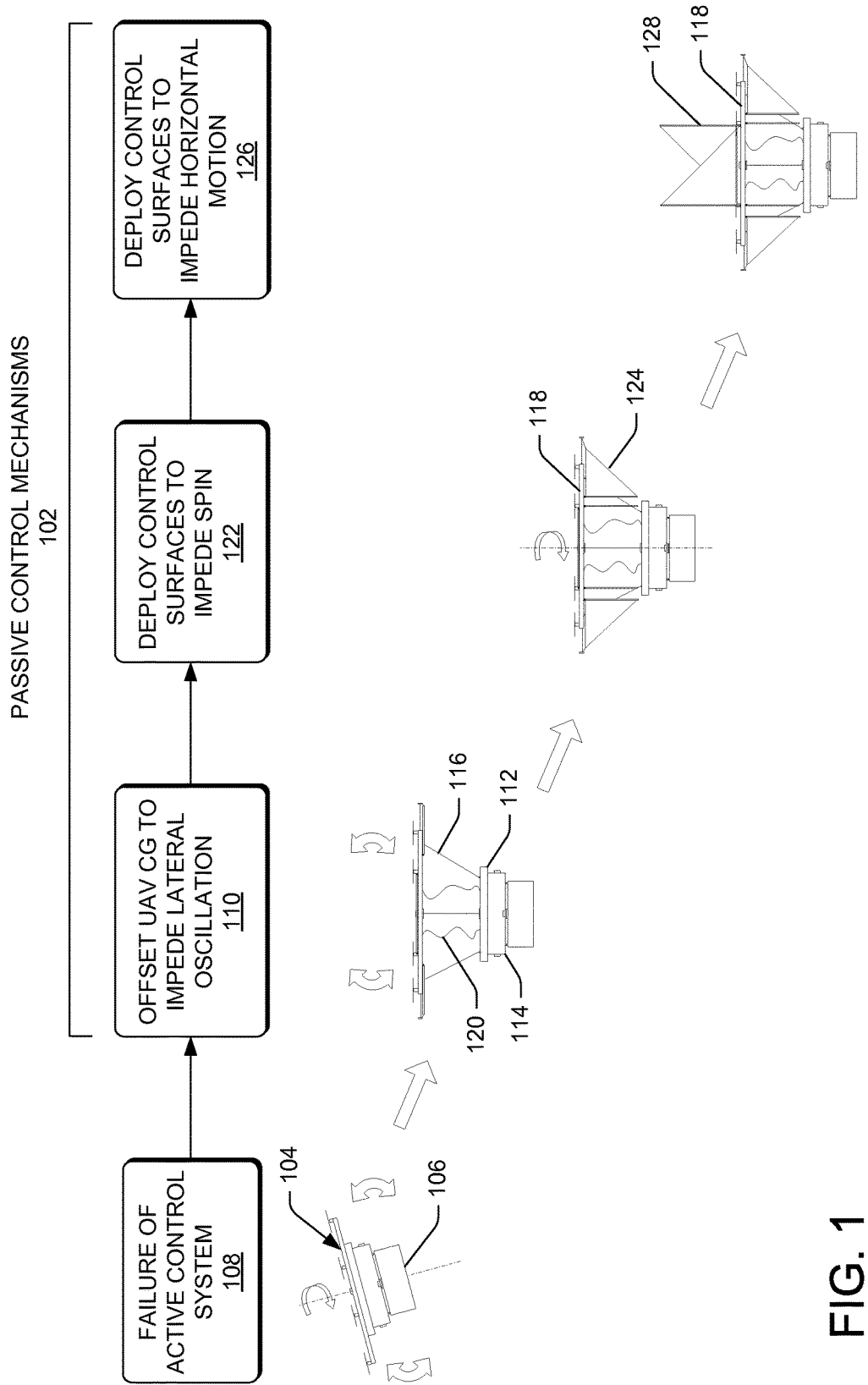
FIG. 1 is a pictorial flow diagram that illustrates deploying a passive control system in an Unmanned Aerial Vehicle (UAV) in response to a identifying a compromised system health condition of an active control system.

In various examples, passive control mechanisms may be used to provide the UAV with passive stability in the form of a pendulum stability, a directional stability, or a combination of both. As used herein, "pendulum stability" refers to stabilizing the UAV from lateral oscillations. A lateral oscillation, as shown in FIG. 1, refers to an oscillation about a horizontal axis of the UAV that is parallel to the horizon. The term "pendulum" is instructive since the center of thrust—generated by the UAV rotors—is offset from the center of gravity of the UAV. This offset causes a pendulum-like oscillation of the UAV mass about the center of thrust. To stabilize the UAV, a stabilizing force may be applied at the center of gravity (CG) of the UAV that is tangential and opposite to the oscillation. In some instances, the stabilizing force may be applied by aerodynamic drag on the UAV.

More importantly, the magnitude of the aerodynamic drag that stabilizes the UAV from a pendulum-like oscillation is inversely proportional to the offset between the center of thrust and the CG of the UAV. In other words, by increasing the offset between the center of thrust and the CG of the UAV, the magnitude of the stabilizing force (i.e. aerodynamic drag), proportionally decreases. Therefore, this disclosure describes passive control mechanisms that provide the UAV with pendulum stability by increasing the offset between the center of thrust and the center of gravity (CG) of the UAV. In some examples, these passive control mechanisms include lowering the CG of the UAV through various combinations of lowering a structure that houses the UAV batteries and control system, an inventory engagement mechanism, and the inventory itself. In other examples, the passive control mechanism can include raising the center of thrust of the UAV using a balloon, box-kite, a parachute, or telescopic rotor-blade shaft.

In various examples, "directional stability" refers to stabilizing the UAV from rotation about a vertical axis of the UAV. In some examples, rotation about the vertical axis of the UAV can be impeded by deploying passive control surfaces that are offset from the rotational center of the UAV. In a non-limiting example, passive control surfaces can be deployed from below a centralized frame of the UAV, as illustrated in FIG. 4D. In this example, the drag force applied onto the passive control surfaces can act to impede a rotation of the UAV about its vertical axis.

In some examples, the passive control mechanism may be used to impede a horizontal motion of the UAV. In a non-limiting example, a plurality of control surfaces may be deployed above a centralized frame of the UAV, as described in FIG. 4C. These control surfaces act to maximize a drag force on the UAV and subsequently impede a horizontal motion.

In response to detecting a compromised active system health condition, the passive control system may indicate a "low level passive control" or a "high level passive control." A "high level passive control" describes a UAV configuration in which the deployment of passive control mechanisms prioritizes stability over maneuverability. A high level passive control can be preferred in turbulent weather conditions, or in response to a complete active control system failure. In these examples, the controlling task may become a priority landing, and the UAV need only retain enough maneuverability to land safely. As a non-limiting example, deploying a high-level passive control may include lowering one or more structures of the UAV to increase an offset between a center of thrust of the UAV and a center of gravity of the UAV.

A "low level passive control" describes a UAV configuration in which the deployment of passive control mechanisms causes only a minor impediment to maneuverability. That is, in response to deploying low level passive control, the UAV may complete its current delivery or task, albeit with a temporal delay. As a non-limiting example, deploying a low-level passive control may include moving ballast within the UAV to their outer-most positions, or deploying one or more control surfaces below a centralized frame of the UAV.

A technical advantage of deploying passive control mechanisms is that a UAV can be designed with the maneuverability and compactness that is typical of a UAV with an active control system, while also retaining passive control features that can be stowed away and deployed as needed.

The techniques, apparatus, and systems described herein may be implemented in a number of ways. Example implementations are provided below with reference to the following figures.

FIG. 1 is a pictorial flow diagram that illustrates deploying passive control mechanisms 102 used by an Unmanned Aerial Vehicle (UAV) 104 in response to identifying a compromised active system health condition and/or another event (e.g., high winds, bad weather, etc.). The UAV 104 can be a winged-craft, a rotorcraft, or a hybrid aircraft that is capable of transporting packages 106 by air from an origination location (i.e. a fulfillment center or near a fulfillment center) to a destination and returning to the origination location.

At block 108, the UAV 104 may experience a compromised active system health condition. Under normal operating conditions, an active control system can continuously monitor the UAV 104 attitude, velocity, and position, and apply micro-corrections to thrust and control surface orientations in order to maintain a continuous stable flight. In some examples, a compromised active system health condition may involve a component failure of the active control system itself, a loss of sensor data from one or more sensor types, or processing irregular sensor data from one or more sensor types. In other examples, the compromised active system health condition may be illustrated by at least one of a diminished thrust output from one or more motors that is left uncorrected by the active control system, a frequency of lateral oscillation about a horizontal axis of the UAV that is left uncorrected by the active control system, and an angular acceleration about a vertical axis of the UAV that is left uncorrected by the active control system. In each example, a compromised active system health condition can cause the UAV 104 to become unstable and may ultimately lead to a catastrophic failure of the UAV 104.

In various examples, the passive control system may independently monitor in-flight data of the UAV 104 and subsequently determine that a system health of the active control system has been compromised. In-flight data may include a rate of change of UAV 104 attitude, velocity, and position. However, the passive control system of the UAV 104 may receive an indication from the active control system that a compromised active system health condition has occurred.

At block 110, the passive control mechanisms 102 may provide the UAV 104 with at least some pendulum stability by causing an increase in the offset between the center of thrust and the center of gravity of the UAV 104. In some examples, the passive control mechanisms 102 may cause the lowering of a structure 112 on the UAV 104 that houses at least one or more of the UAV batteries, control system, or inventory engagement mechanism 114. The structure 112 and inventory engagement mechanism 114 may be lowered via cords 116. In some embodiments, the cords may attach to a centralized frame 118 of the UAV 104. Further, a separate communicative connection 120 may extend between the UAV batteries, control system, and motors to ensure the UAV 104 remains operational when the structure 112 and inventory engagement mechanism 114 are lowered.

At block 122, the passive control mechanisms 102 may provide the UAV 104 with at least some rotational stability (i.e. spin) by deploying one or more spin-brake control surfaces 124 that pivot downward from below the centralized frame 118 of the UAV 104. The one or more spin-brake control surfaces 124 are offset from the rotational axis of the UAV 104, and thus may induce a drag force that impedes a rotation of the UAV 104 about its vertical axis.

At block 126, the passive control mechanisms 102 may impede a horizontal motion of the UAV 104 by deploying one or more airbrake control surfaces 128 position on a top surface of the UAV 104. In this example, the one or more airbrake control surfaces 128 provide additional surface area that may induce a drag force that can ultimately impede a horizontal motion of the UAV 104.

Figure 2:
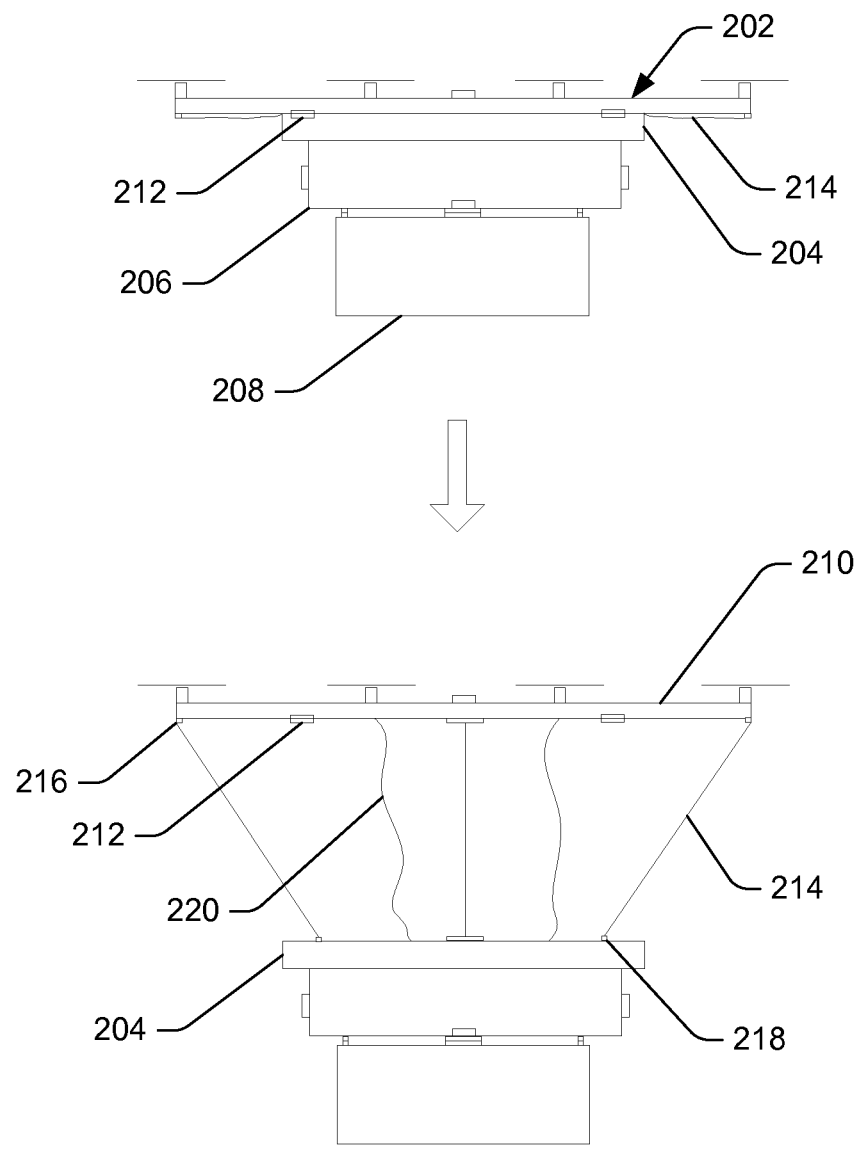
FIG. 2 is a pictorial flow diagram of a UAV configuration that can restore at least some pendulum stability by lowering the center of gravity (CG) of the UAV.

FIG. 2 illustrates a UAV 202 configuration that can restore at least some stability of the UAV 202 subjected to pendulum movement by lowering the center of gravity (CG) of supporting structure 204 of the UAV 202. In doing so, an offset between the center of thrust and the CG of the UAV 202 increases, which subsequently restores at least some pendulum stability to the UAV 202.

In the illustrated example, the UAV 202 can lower a supporting structure 204. In various examples, the supporting structure 204 can house the UAV 202 batteries and control system. In other examples, the supporting structure 204 can also support an inventory engagement mechanism 206 and a package 208.

In the illustrated example, the supporting structure 204 is selectively coupled to an airframe 210 of the UAV 202 via one or more release mechanisms 212 and one or more cords 214. In some examples, a first end of the one or more cords 214 can be attached to the airframe 210 at an attachment point 216. A second end of the one or more cords 214 can attach to an attachment point 218 on the supporting structure 204.

In various examples, the release mechanism 212 can selectively uncouple the supporting structure 204 from the airframe 210 in response to receiving an indication from a passive control system. In doing so, the supporting structure 204 may freefall from the airframe 210 by the length of the one or more cords 214. In some examples, the one or more cords 214 may include dynamic cords. In other examples, a dampener may be included to dampen the freefall of the supporting structure 204 from the airframe 210.

In other examples, a first end of the one or more cords 214 can be attached to the airframe 210 via spools that can retract and extend the one or more cords 214, as needed. A second end of the one or more cords 214 can be further attached to an attachment point 218 on the supporting structure 204. In various examples, the one or more cords 214 can be unwound and wound from the spools in response to receiving an indication from a passive control system associated with the UAV 202. In some examples, the one or more cords 214 can include a wire, a cable, or a string. This in turn causes the supporting structure 204 to lower from the airframe 210 when the one or more cords 214 are unwound. Further, the supporting structure 204 can be raised towards the airframe 210 in response to the one or more cords 214 being wound back into the spools using one or more motors, as described below with reference to FIG. 9.

In the illustrated example, a communicative connection 220 is maintained between the airframe 210 and the supporting structure 204. In some examples, the airframe 210 can house a propulsion system for the UAV 202. Further, the supporting structure 204 can house batteries and a control system that support the propulsion system. By maintaining a communicative connection 220 between the airframe 210 and supporting structure 204, this ensures that the propulsion system remains functional in the event that the supporting structure 204 is lowered from the airframe 210.

In various examples, the UAV 202 can lower the inventory engagement mechanism 206 from the supporting structure 204. In some examples, the inventory engagement mechanism 206 can support a package 208 that is to be delivered by the UAV 202 to a delivery destination. The inventory engagement mechanism 206 can be selectively coupled to the supporting structure 204 via one or more release mechanisms 222 and one or more cords 224. In various examples, the release mechanism 222 can selectively uncouple from the supporting structure 204 in response to receiving an indication from a passive control system. In doing so, the inventory engagement mechanism 206 may freefall from the supporting structure 204 by the length of one or more cords 214. In some examples, the one or more cords 214 may include dynamic cords. In other examples, a dampener may be included to dampen the freefall of the inventory engagement mechanism 206 from the supporting structure 204.

In some examples, a first end of the one or more cords 224 can be attached to the supporting structure via spools 226 that can retract and extend the one or more cords 224, as needed. A second end of the one or more cords 224 can be further attached to an attachment point 228 on the inventory engagement mechanism 206. In some examples, the one or more cords 224 can be unwound and wound from the spools 226 in response to receiving an indication from a passive control system. This in turn causes the inventory engagement mechanism 206 to lower from the supporting structure 204 when the one or more cords 224 are unwound. In some examples, the one or more cords 224 can include a wire, a cable, or a string. Further, the inventory engagement mechanism 206 can be raised towards the supporting structure 204 in response to the one or more cords 224 being wound back into the spools 226.

Figure 3:
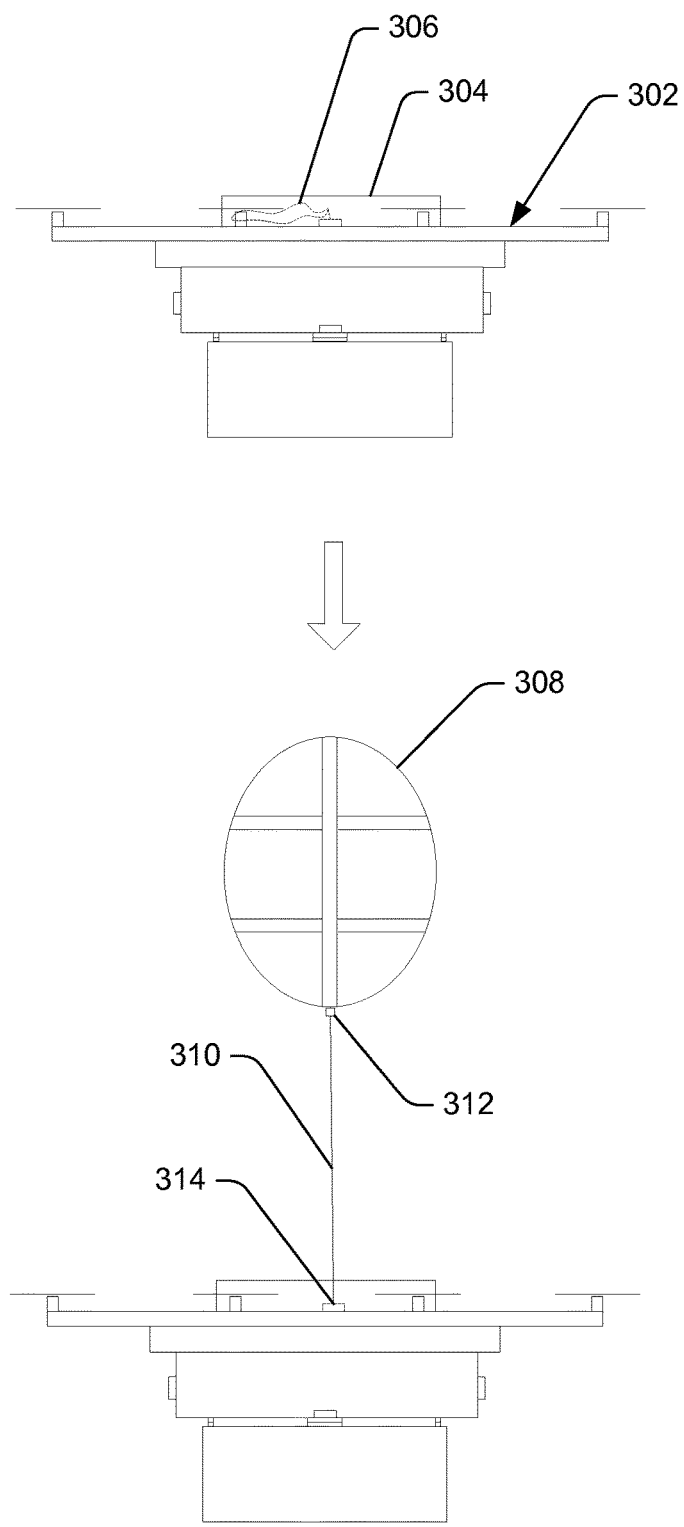
FIG. 3 illustrates a passive control mechanism that involves raising the center of thrust of the UAV in order to increase the offset between the center of thrust and the CG of the UAV.

FIG. 3 illustrates a passive control mechanism that involves raising the center of thrust of the UAV in order to increase the offset between the center of thrust and the CG of the UAV 302. In doing so, the offset between the center of thrust and the CG of the UAV 302 can provide the UAV 302 with at least some pendulum stability.

In the illustrated example, the UAV 302 can include a compartment 304 on a top surface of the UAV 302 that can house one or more aerodynamic elements, such as one or more deflated balloons 306. In other examples, the aerodynamic element can include a box-kite or any other aerodynamic element that can provide at least some lift force to counter a weight of the UAV 302.

In the illustrated example, the one or more deflated balloons 306 are stored within the compartment 304 of the UAV 302 and are automatically inflated upon release. In some examples, a deflated balloon 306 can be inflated to form an inflated balloon 308 by injecting a lighter-than-air gas from a canister that is attached to the balloon inlet. In some examples, the lighter than air gas may include helium. In the illustrated example, the one or more deflated balloons 306 can be coupled to the UAV 302 via a cord 310. In various examples, a cord 310 can include a wire, a cable, or a string. In some examples, a first end of the cord 310 can be attached to an attachment point 312 on the one or more deflated balloons 306. Further, a second end of the cord 310 can be attached to the UAV 302 via an attachment point 314. In other examples, the second end of the cord 310 can be attached to the UAV 302 via a spool at the attachment point 314. In this example, the spool can extend and retract the cord 310. In various examples, the cord 310 can be unwound and wound from the spool in response to receiving an indication from a passive control system associated with the UAV 302.

In another example, the center of thrust of the UAV 302 can be raised using a plurality of telescopic rotor blade shafts on the motors of a multi-rotor UAV 302. For example, by extending a telescopic rotor blade shaft, the plane of the rotor blades is offset upwards, thus raising the center of thrust of the UAV 302. This in turn increases the offset between the center of thrust and the CG of the UAV 302. In doing so, the UAV 302 can be provided with at least some pendulum stability.

Figure 4A:
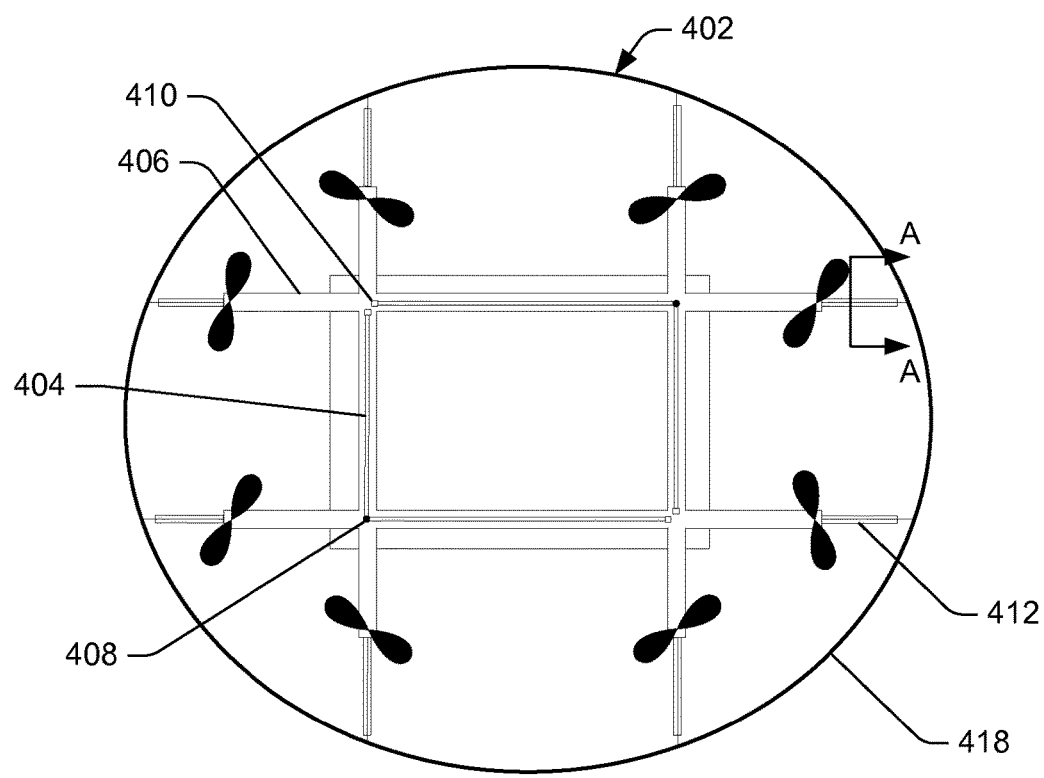
FIGS. 4A through to 4E illustrate a deployment of one or more controls surfaces that provide a UAV with at least some lateral stability and impede a horizontal motion.
Figure 4B:
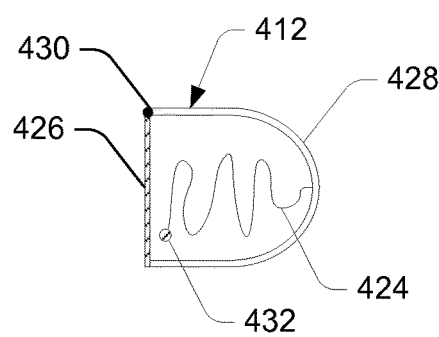
FIG. 4B is a cross-section view through Section A-A of FIG. 4A and illustrates a control surface fabric being stowed within an internal cavity of a control surface mast.
Figure 4C:
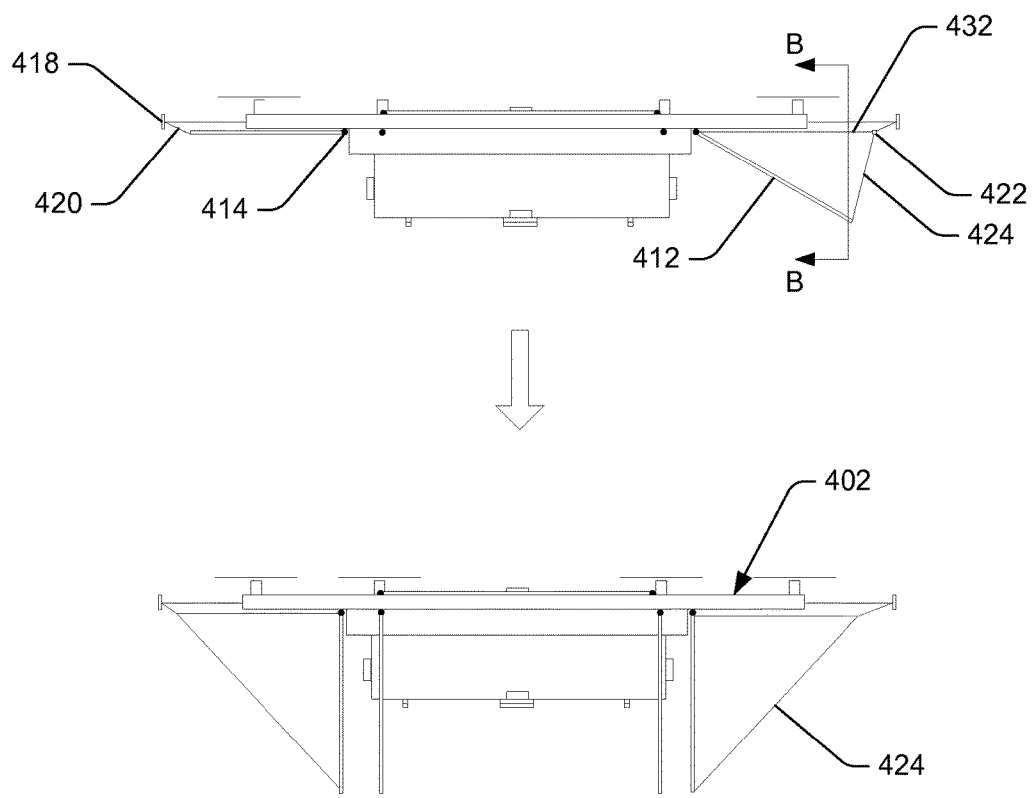
FIG. 4C illustrates a side elevation view of the UAV and depicts a partial deployment of a control surface that is stowed on the under-side of the UAV.
Figure 4D:
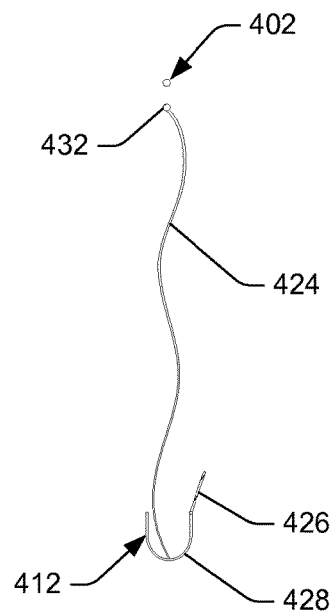
FIG. 4D is a cross-section view through Section B-B of FIG. 4C and illustrates a control surface fabric being deployed out of an internal cavity of a control surface mast.

FIGS. 4A through 4E illustrate a deployment of one or more controls surfaces that provide a UAV 402 with at least some lateral stability and impede a horizontal motion. FIG. 4A illustrates a plan view of a UAV 402 and illustrates a plurality of control surface masts in a stowed position. In the illustrated example, control surface masts can be coupled to an upper-side surface of the UAV 402. In this example, the upper control surface mast(s) 404 can correspond to airbrake control surfaces. In some examples, air-brake control surfaces can impede a horizontal motion of the UAV 402 by providing additional surface area to induce a drag force. The air-brake control surfaces are described in more detail in FIG. 4E.

In a stowed position, the upper control surface mast(s) 404 are oriented to stow or nest alongside the upper-side surface of the airframe 406 of the UAV 402. The upper control surface mast(s) 404 can be attached to the upper-side surface of the airframe 406 at one of two pivot point(s) 408. In various examples, the upper control surface mast(s) 404 can be biased to store potential energy in the stowed position using a torsional spring at the pivot point(s) 408. Further, the upper control surface mast(s) 404 can be locked in the stowed position using a release mechanism 410 that is coupled to the opposite free end of the upper control surface mast(s) 404. In this example, the upper control surface mast(s) 404 can be deployed by causing the release mechanism 410 to disengage in response to receiving an indication from a passive control system. In doing so, the torsional spring may release the potential energy and cause the upper control surface mast(s) 404 to rotate about the pivot point(s) 408 to be substantially perpendicular to the airframe 406 and protrude into the airstream.

Further, control surface masts can be coupled to an underside surface of the UAV 402. In this example, lower control surface mast(s) 412 may correspond to spin-brake control surfaces. In some examples, spin-brake control surfaces can provide the UAV 402 with at least some rotational stability by generating a drag force that opposes a rotation of the UAV 402 about its vertical axis. The spin-brake control surfaces are illustrated in FIG. 4C.

In a stowed position, the lower control surface mast(s) 412 are oriented to stow or nest alongside the under-side surface of the airframe 406 of the UAV 402. A first end of the lower control surface mast(s) 412 can be attached to the under-side surface of the airframe 406 at a pivot point(s) 414. In various examples, the lower control surface mast(s) 412 can be biased in the stowed position using a torsional spring at the pivot point(s) 414. Further, the free end of the lower control surface mast(s) 412 can be coupled to a barrier frame 418 of the UAV via a first cord 420. In some examples, the first cord 420 can include a wire, cable, or string. In some examples, the lower control surface mast(s) 412 can be locked in the stowed position using a release mechanism 422 that couples between the first cord 420 and the barrier frame 418. In this example, the lower control surface mast(s) 412 can be deployed by causing the release mechanism 422 to disengage from the lower control surface mast(s) 412. In some examples, the release mechanism 422 may disengage in response to receiving an indication from a passive control system. In doing so, the torsional spring may cause the lower control surface mast(s) 412 to rotate about the pivot point(s) 414 to be substantially perpendicular to the airframe 406 and protrude into the airstream.

FIG. 4B illustrates a cross-section view through Section A-A of FIG. 4A and a control surface fabric 424 being stowed within an internal cavity of lower control surface mast(s) 412. In the illustrated example, the lower control surface mast(s) 412 may comprise of a flat panel 426 and a curved panel 428. The curved panel 428 may have a semi-elliptical or semi-circular cross-section. The edges of the flat panel 426 and the curved panel 428 can be coupled together to form a closed cross-section, providing the lower control surface mast(s) 412 with at least some structural rigidity. In the illustrated example, one coupling edge between the flat panel 426 and the curved panel 428 may include a spring-loaded hinge 430. In some examples, the spring-loaded hinge 430 can be biased in a closed position. Further, the opposite coupling edge between the flat panel 426 and the curved panel 428 can include a series of release mechanisms. In some examples, when the lower control surface mast(s) 412 are deployed, the release mechanisms may disengage and cause the spring-loaded hinge 430 to open, allowing the control surface fabric 424 to unfold from within the internal cavity of the lower control surface mast(s) 412.

In some examples, the control surface fabric 424 can be coupled to an internal wall of the lower control surface mast(s) 412. Further, the opposite edge of the control surface fabric 424 can be coupled to a second cord 432 that extends along the length of the lower control surface mast(s) 412 when in the stowed position, as depicted in FIG. 4C. Particularly, the second cord 432 may extend between the pivot point(s) 414 and the barrier frame 418 of the UAV 402. In some examples, the second cord 432 can include a wire, cable, or string. In the illustrated example of FIG. 4C, when the lower control surface mast(s) 412 deploys, the control surface fabric 424 can unfold between its fixed edge along the second cord 432 and its opposite edge that is rotating with the lower control surface mast(s) 412. In some examples, the control surface fabric 424 can include, but is not limited to synthetic sailcloth, linen, hemp, or cotton. In various examples, the control surface fabric 424 is coupled to an internal wall of each mast.

In an alternate embodiment, the control surface mast(s) 412 for the spin-brake control surfaces can be oriented to stow or nest alongside the upper-side surface of the airframe 406 of the UAV 402 rather than the under-side, and move to an upward deployed position on the upper-side surface of the UAV 402. This embodiment can be used on a UAV configuration where the rotor blades are covered by a shroud that protects the spin-brake control surfaces from the rotor blades.

Figure 4E:
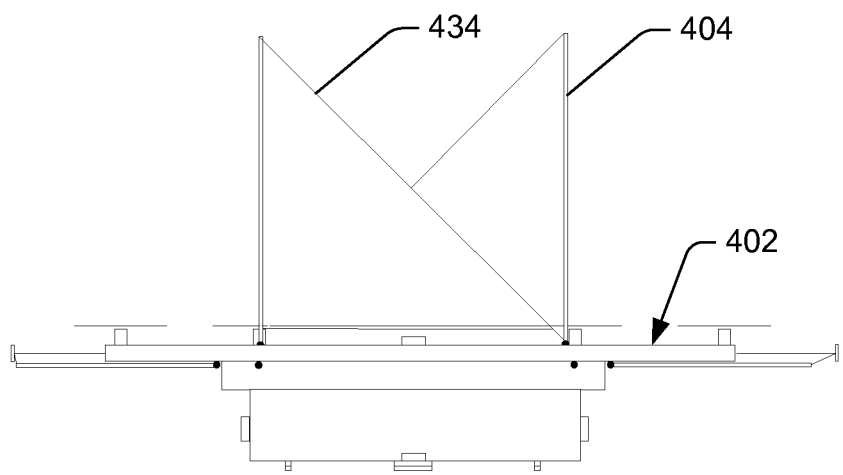
FIG. 4E is a side elevation view of the UAV and illustrates a plurality of control surfaces deployed from an upper-side of the UAV.

In the illustrated example of FIG. 4E, a plurality of air brake control surfaces are depicted in a deployed position on the upper-side surface of the UAV 402. In the illustrated example, the air-brake control surfaces are shown to pivot about one of two pivots points. An advantage of this configuration is that each pair of control surfaces can form a right-angle section that protrudes into the airstream. This configuration can help alleviate the potential of inducing a spin about a vertical axis of the UAV 402. In some examples, the cross-section view of FIG. 4B may also correspond to an internal cavity of the upper control surface mast(s) 404. Further, the deployment of the control surface fabric 424 of the lower control surface mast(s) 412 can correspond to the deployment of the control surface fabric 434 of the upper control surface mast(s) 404.

Figure 5:
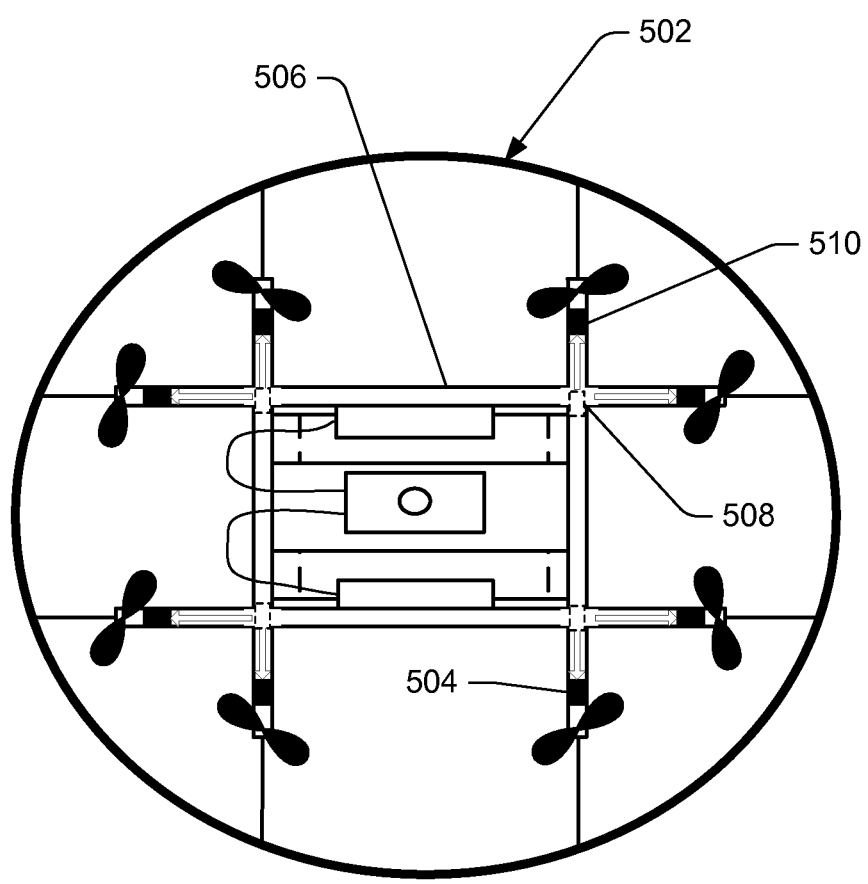
FIG. 5 is a plan view of a UAV that illustrates moving ballast within the centralized frame to their outer-most positions.

FIG. 5 illustrates a plan view of a UAV 502 that illustrates moving ballast 504 within an airframe 506 in order to affect an overall stability of the UAV 502. In various examples, ballast 504 can be moved from an original centralized position 508 to an outer-most position 510. In doing so, the UAV 502 can become more stable. In some examples, ballast 504 can be held at the original centralized position 508 in cases where the UAV 502 prioritizes maneuverability over stability. In various examples, a move of ballast 504 can occur in response to an indication received from a passive control system associated with the UAV 502. In some examples, the ballast 504 can be moved to an outer-most position to provide additional stability to the UAV 502. In other examples, a movement of ballast 504 may be an additional steering mechanism of the UAV 502. The system that enables a movement of the ballast 504 is discussed in detail in U.S. patent application Ser. No. 14/497,136 entitled "Ballast Control Mechanisms for Aerial Vehicles," which is incorporated by reference herein in its entirety.

Figure 6A:
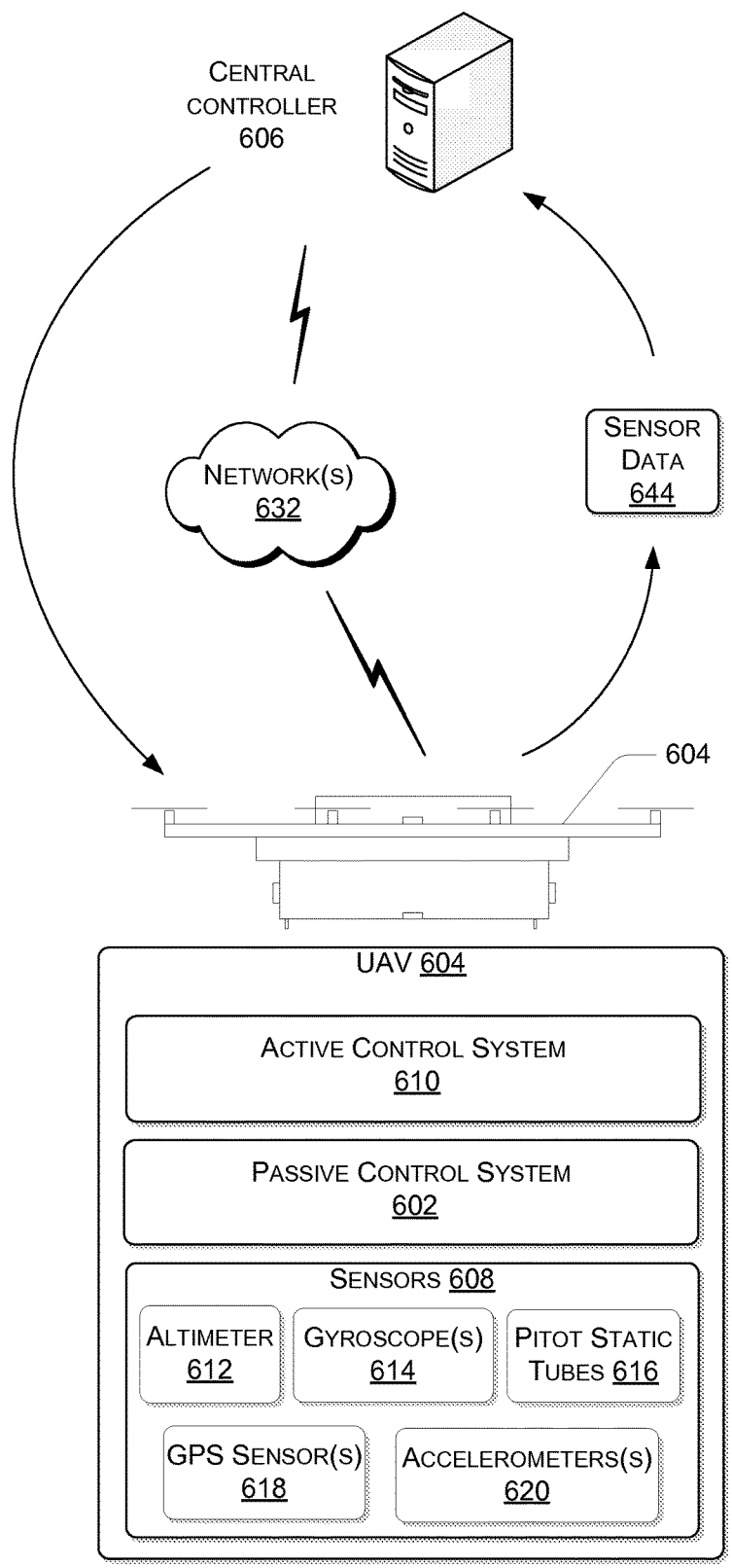
FIGS. 6A through to 6C illustrates block diagrams of components of an example passive control system of a UAV.
Figure 6B:
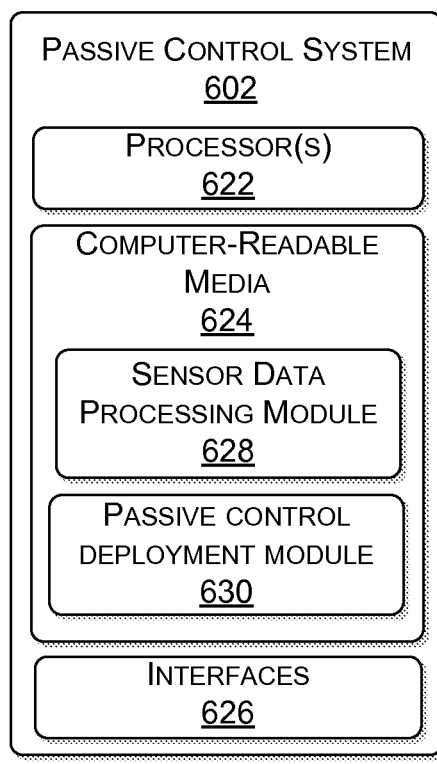
FIG. 6B illustrates a block diagram of components of a passive control system on a UAV.
Figure 6C:
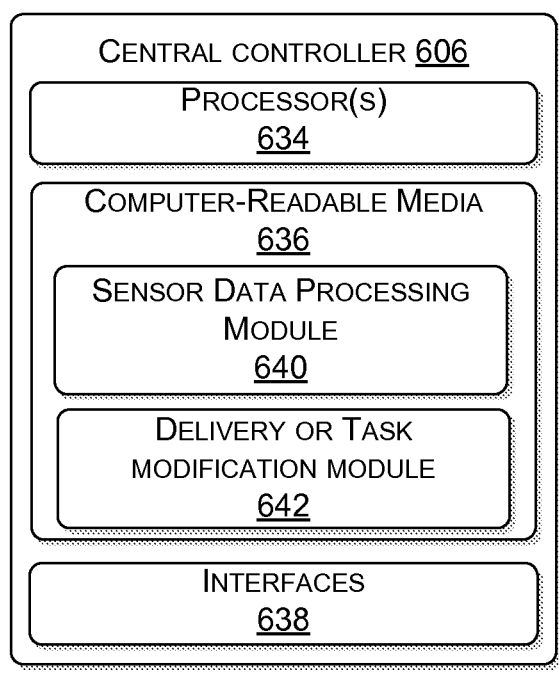
FIG. 6C illustrates a block diagram of components of a central controller that can modify a UAV task in response to a deployment of one or more passive control mechanisms.

FIGS. 6A through 6C illustrate block diagrams of components of a passive control system 602 on a UAV 604 and a central controller 606. In some examples, the passive control system 602 can process sensor data from one or more sensors 608 on the UAV 604 and cause a passive control mechanism to deploy while the UAV 604 is in-flight. Further, the central controller 606 can determine a modification to a delivery or a task for the UAV 604 in response to receiving an indication of a deployment of a passive control mechanism on the UAV 604. In various examples, the passive control system 602 can cause a passive control mechanism to deploy on the UAV 604 in the event that a system health of an active control system 610 on the UAV 604 has been compromised. In other examples, the passive control mechanism can deploy in response to bad weather conditions, or a loss of communication with the central controller 606. An advantage of this configuration is that the UAV 604 can safely operate autonomously without a need for intervention by central controller 606, in the vent that a communicative connection cannot be established.

In various examples, the passive control system 602 can acquire sensor data from one or more sensors 608 coupled to the UAV 604. In various examples, the sensor data can include in-flight data that monitors the UAV 604 attitude, velocity, and position. For example, the UAV 604 can be equipped with one or more sensors 608 that include an altimeter 612, a gyroscope 614, a pitot static tube 616, a global positioning system (GPS) sensor 618, and one or more accelerometers 620.

In various examples, the altimeter 612 is a pressure instrument that can be used to determine the altitude of the UAV 604. The altimeter 612 can be used to monitor a rate at which the UAV 604 changes altitude. In some examples, the rate of change in altitude may indicate an unstable descent that may be the result of a compromised active system health condition. The gyroscope 614 can be used to measure the orientation of the UAV 604. In some examples, the rate of change in orientation of the UAV 604 may be indicative of a compromised active system health condition. The GPS 618 can be used to determine the geolocation of the UAV 604 as well as velocity of the UAV 604 relative to the ground. The one or more accelerometers 620 can be used to measure relative translational movements of the UAV 604. In some examples, the pitot static tubes 616 can be used to measure a local air velocity at a given point in an airstream.

In other words, the pitot static tubes 616 can measure the UAV 604 air speed relative to a headwind, tailwind, and crosswind. In some examples, a direction and magnitude of a headwind, tailwind, and crosswind can be determined by using the air speeds measured by a pitot static tube 616 and the relative ground speed measured by a GPS 618 sensor.

In various examples, the passive control system 602 can include one or more processor(s) 622 operably connected to the computer-readable media 624. The passive control system 602 can also include one or more interfaces 626 that enable communication with other networked devices, such as a central controller 606. The one or more interfaces 626 can include network interface controllers (NICs), I/O interfaces, or other types of transceiver devices to send and receive communications over a network. For simplicity, other computers are omitted from the illustrated UAV 604.

The computer-readable media 624 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In some embodiments, the computer-readable media 624 can include a sensor data processing module 628 and a passive control deployment module 630. The sensor data processing module 628 can receive the sensor data from the one or more sensors 608 of the UAV 604. The sensor data processing module 628 can process the sensor data to determine a UAV 604 attitude, velocity, and position. The sensor data processing module 628 can further determine environment conditions (i.e. bad weather conditions), including a magnitude and direction of wind, a free stream airspeed, and a ground speed of the UAV 604.

In the illustrated example, the passive control deployment module 630 can cause the deployment of passive control mechanisms in the UAV 604. In a non-limiting example, the passive control mechanisms can include lowering support structure of the UAV to increase an offset between a UAV 604 center of thrust and a center of gravity, deploying one or more air-brake control surfaces, or deploying spin-brake control surfaces. In the illustrated example, the passive control deployment module 630 can cause a passive control mechanism to deploy on the UAV 604 in response receiving an indication of the UAV 604 attitude, velocity, and position from the sensor data processing module 628. In another example, the passive control deployment module 630 can cause a passive control mechanism to deploy in response to receiving an indication of a compromised active system health condition on the UAV 604, or a communicative connection with the central controller 606 has failed. In various examples, the passive control deployment module 630 may be additionally, or alternatively, installed on the central controller 606.

In the illustrated example, the UAV 604 can communicate with a central controller 606 via one or more network(s) 632. The one or more network(s) 632 can include public networks such as the Internet, private networks such as an institutional and/or personal intranet, or some combination of private and public networks. Network(s) can also include any type of wired and/or wireless network, including but not limited to local area network (LANs), wide area networks (WANs), satellite networks, cable networks, Wi-Fi network, WiMax networks, mobile communications networks (e.g. 3G, 4G, and so forth), Bluetooth or near field communication (NFC) networks, or any combination thereof.

In various examples, the central controller 606 can include one or more processor(s) 634 operably connected to the computer-readable media 636. The central controller 606 can also include one or more interfaces 638 that enable communication with other networked devices, such as the UAV 604. The one or more interfaces 638 can include network interface controllers (NICs), I/O interfaces, or other types of transceiver devices to send and receive communications over a network. For simplicity, other computers are omitted from the illustrated UAV 604.

The computer-readable media 636 can correspond to computer-readable media 624. In some embodiments, the computer-readable media 636 can include a sensor data processing module 640 and a delivery or task modification module 642.

In the illustrated example, the sensor data processing module 640 on the central controller 606 can correspond to the sensor data processing module 628 on the UAV 604. For example, UAV 604 can transmit sensor data 644 to the central controller 606 via the one or more network(s) 632. The sensor data 644 may include sensor data from the one or more sensors 608 coupled to the UAV 604. In this example, the sensor data processing module 640 can process the sensor data 644 to determine a UAV 604 attitude, velocity, and position. The sensor data processing module 640 can further determine environment conditions (i.e. bad weather conditions), including a magnitude and direction of wind, a free stream airspeed, and a ground speed of the UAV 604. In other examples, the sensor data 644 that is received from the UAV 604 may include the UAV 604 attitude, velocity and position that is based at least in part on the processed sensor data from the sensor data processing module 628 of the UAV 604.

In the illustrated example, the delivery or task modification module 642 of the central controller 606 can receive processed sensor data from the sensor data processing module 628 or 640. The delivery or task modification module 642 determines whether the passive control system 602 is to implement "low level" passive control or "high level" passive control. In various examples, "high level" passive control pertains to a passively controlled UAV configuration in which the UAV 604 lacks sufficient maneuverability to complete its original delivery or task. As a result, the delivery or task modification module 642 may re-prioritize the delivery or task of the UAV 604 to land at the nearest available location. In this example, the UAV 604 need only retain enough maneuverability to land safely. The delivery or task modification module 642 may implement a "high level" passive control in response to an indication of turbulent weather conditions, or in response to a significant compromise to system health of an active control system. As a non-limiting example, a significant compromise to system health of an active control system may include a failure of multiple motors on the UAV 604, or a loss of all sensor data from one or more sensor types. In some examples, deploying passive controls in response to a "high level" indication may include lowering one or more structures of the UAV 604 to increase an offset between a center of thrust and a center of gravity of the UAV, as well as deploying one or more spin-brake or airbrake control surfaces to impede a spin and reduce a horizontal motion of the UAV 604 respectively.

In various examples, the delivery or task modification module 642 may further implement a "low level" passive control on the UAV 604 based on the processed sensor data from the sensor data processing module 628. In various examples, a "low level" passive control pertains to a passively controlled UAV configuration in which the UAV 604 retains sufficient maneuverability to complete its original delivery or task. The delivery or task modification module 642 may implement a "low level" passive control in response to an indication of a minor disruption to the thrust output of one or more rotors. In some examples, deploying passive controls in response to a "low level" indication may include moving UAV ballast to their outermost positions, or deploying one or more spin-brake control surfaces that act to impede a rotational spin of the UAV 604.

Figure 7:
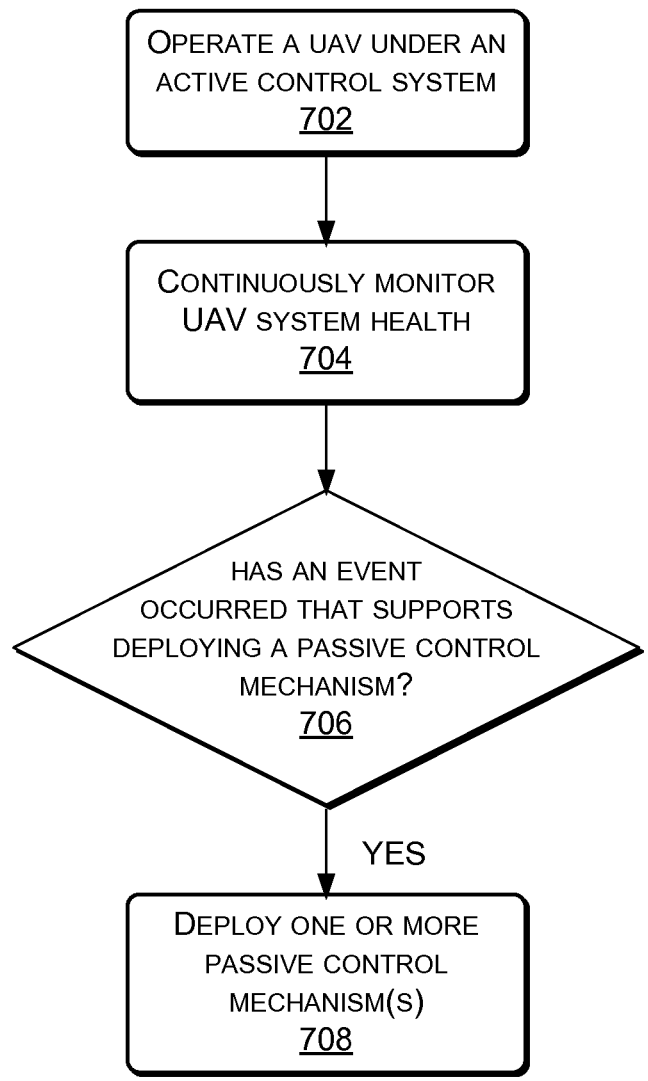
FIG. 7 is a flow diagram of a passive control system on a UAV causing a deployment of one or more passive control mechanisms on the UAV.

FIG. 7 is a flow diagram of a passive control system causing a deployment of one or more passive control mechanisms. The passive control mechanisms can include at least one of spin-brake control surfaces, air-brake control surfaces, and a mechanism that causes an increased offset between the center of thrust and the center of gravity of the UAV.

At 702, the passive control system may receive an indication that a system health of an active control system has been comprised. In various examples, the passive control system may receive the indication from the active control system itself. In other examples, the passive control system may additionally, or alternatively, continuously monitor in-flight data of a UAV to independently detect a change in system health of the active control system.

At 704, the passive control system may receive sensor data from one or more sensors of the UAV. In various examples, the sensor data can be sourced from sensors installed the UAV. In some examples, UAV sensors include an altimeter, gyroscope, GPS sensor, pitot static tube and one or more accelerometers.

At 706, the passive control system may process the sensor data to determine environmental conditions surrounding the UAV, and UAV characteristics including attitude, velocity, and position. In various examples, sensor data from two or more sensor types can be combined to determine an environmental condition or a UAV characteristic.

At 708, the passive control system cause a deployment of one or more passive control mechanisms in response to processed sensor data. In some examples, the processed sensor data may identify a lateral oscillation of the UAV, a spin of the UAV, or an excessive horizontal motion of the UAV.

Figure 8:
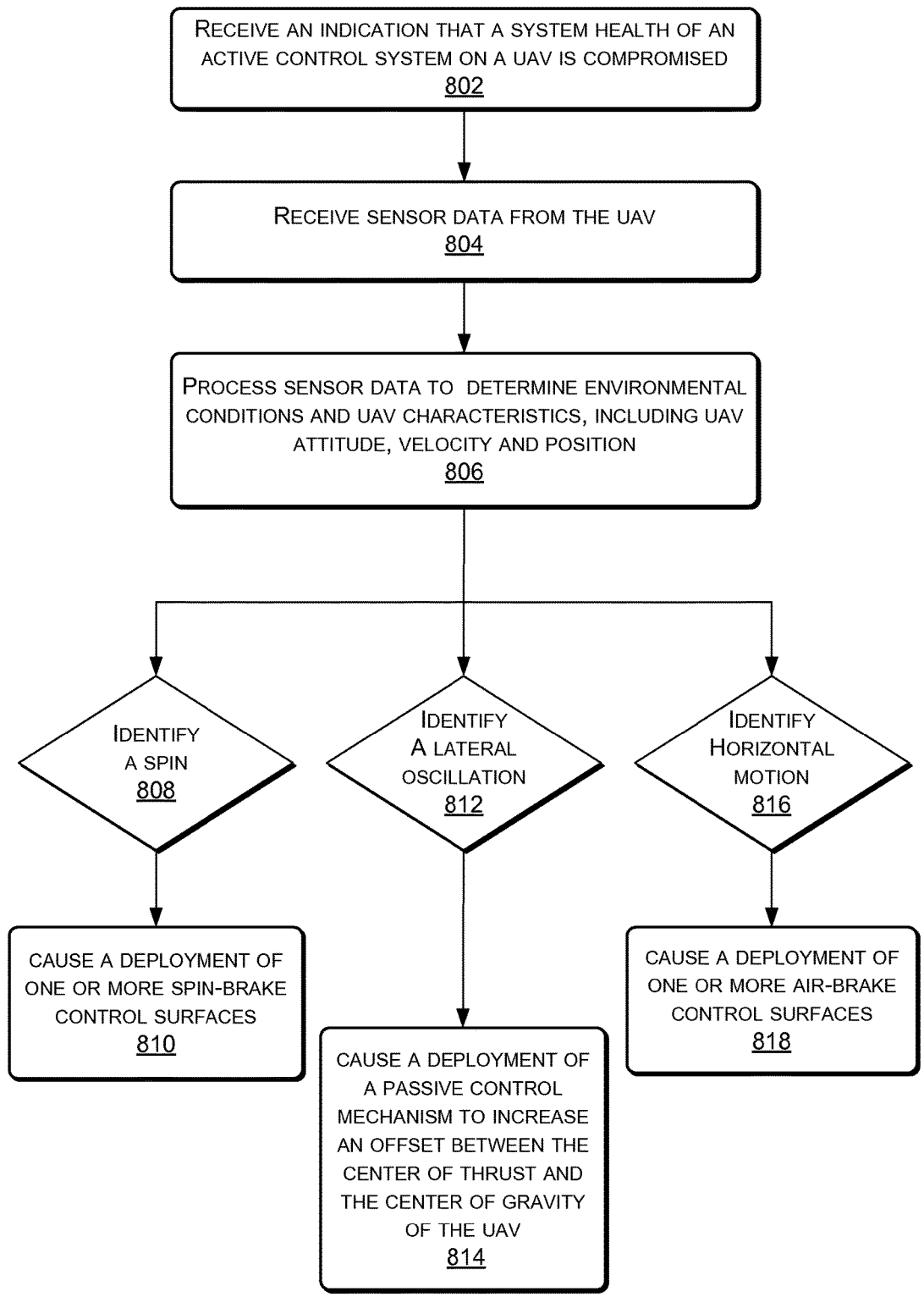
FIG. 8 is a flow diagram of a passive control system causing a deployment of a plurality of passive control mechanisms in response to receiving an indication of a compromised system health condition of an active control system.

FIG. 8 is a flow diagram of a passive control system that causes a deployment of a plurality of passive control mechanisms in response to receiving an indication that a system health of an active control system has been compromised. In various examples, the passive control system can cause a deployment of one or more passive control mechanisms, including spin-brake control surfaces, air-brake control surfaces, and a mechanism to increase an offset between the center of thrust and the center of gravity of the UAV.

At 802, the passive control system may receive an indication that a system health of an active control system of a UAV has been compromised. In various examples, the passive control system may receive the indication from the active control system itself. In other examples, the passive control system may additionally, or alternatively, continuously monitor in-flight data of a UAV to independently detect a compromised system health condition of the active control system.

At 804, the passive control system may receive sensor data from one or more sensors of the UAV. In various examples, the sensor data can be sourced from sensors installed the UAV. In some examples, UAV sensors include an altimeter, gyroscope, GPS sensor, pitot static tube and one or more accelerometers.

At 806, the passive control system may process the sensor data to determine environmental conditions surrounding the UAV, and UAV characteristics including attitude, velocity, and position. In various examples, sensor data from two or more sensor types can be combined to determine an environmental condition or a UAV characteristic. For example, the pitot static tubes can be used to measure a local air velocity at a given point in an airstream, while a GPS sensor can be used to measure the UAV airspeed relative to the ground. As a result, the combined sensors data of the pitot static tube and GPS sensor can be used to determine a direction and magnitude of a headwind, tailwind, and crosswind.

At 808, the passive control system can identify a rotation about a vertical axis of the UAV (i.e. spin) based at least in part on the processed sensor data. The processed sensor data may include a rotational acceleration based on gyroscope and/or accelerometer sensor data.

At 810, in response to identifying a spin, the passive control system can impede the spin by deploying one or more spin-brake control surfaces. In various examples, one or more spin-brake control surfaces pivot downward from below a centralized frame of the UAV. In some examples, the spin-brake control surfaces are offset from the rotational axis of the UAV, and thus may induce a drag force that impedes a spinning rotation of the UAV.

At 812, the passive control system can identify a lateral oscillation of the UAV based at least in part on the processed sensor data. The processed sensor data may include a rate of change in UAV orientation based on gyroscope and accelerometer sensor data can provide an indication of a lateral oscillation.

At 814, in response to identifying a lateral oscillation, the passive control system can provide at least pendulum stability of the UAV by causing an increase in the offset between the center of thrust and the center of gravity of the UAV. In some examples, the passive control system can lower a structure on the UAV that houses the UAV batteries, control system, and inventory engagement mechanism, thereby lowered the CG of the UAV, and increasing the offset from the center of thrust. The structure may be lowered via cords that spool from a centralized frame of the UAV. In another example, a balloon or box-kite structure may be deployed from a top surface of the UAV. In doing so, the center of thrust is raised, thereby increasing the offset from the CG of the UAV.

At 816, the passive control system can identify an excessive horizontal motion of the UAV based at least in part on the processed sensor data. The processed sensor data can provide an indication of horizontal motion based on accelerometer and/or GPS sensor data.

At 818, in response to identifying an excessive horizontal motion of the UAV, the passive control system can cause one or more air-brake control surfaces to deploy from the top surface of the UAV. In various examples, the air-brake control surfaces provide additional surface area that may induce a drag force that can ultimately impede a horizontal motion of the UAV.

Figure 9:
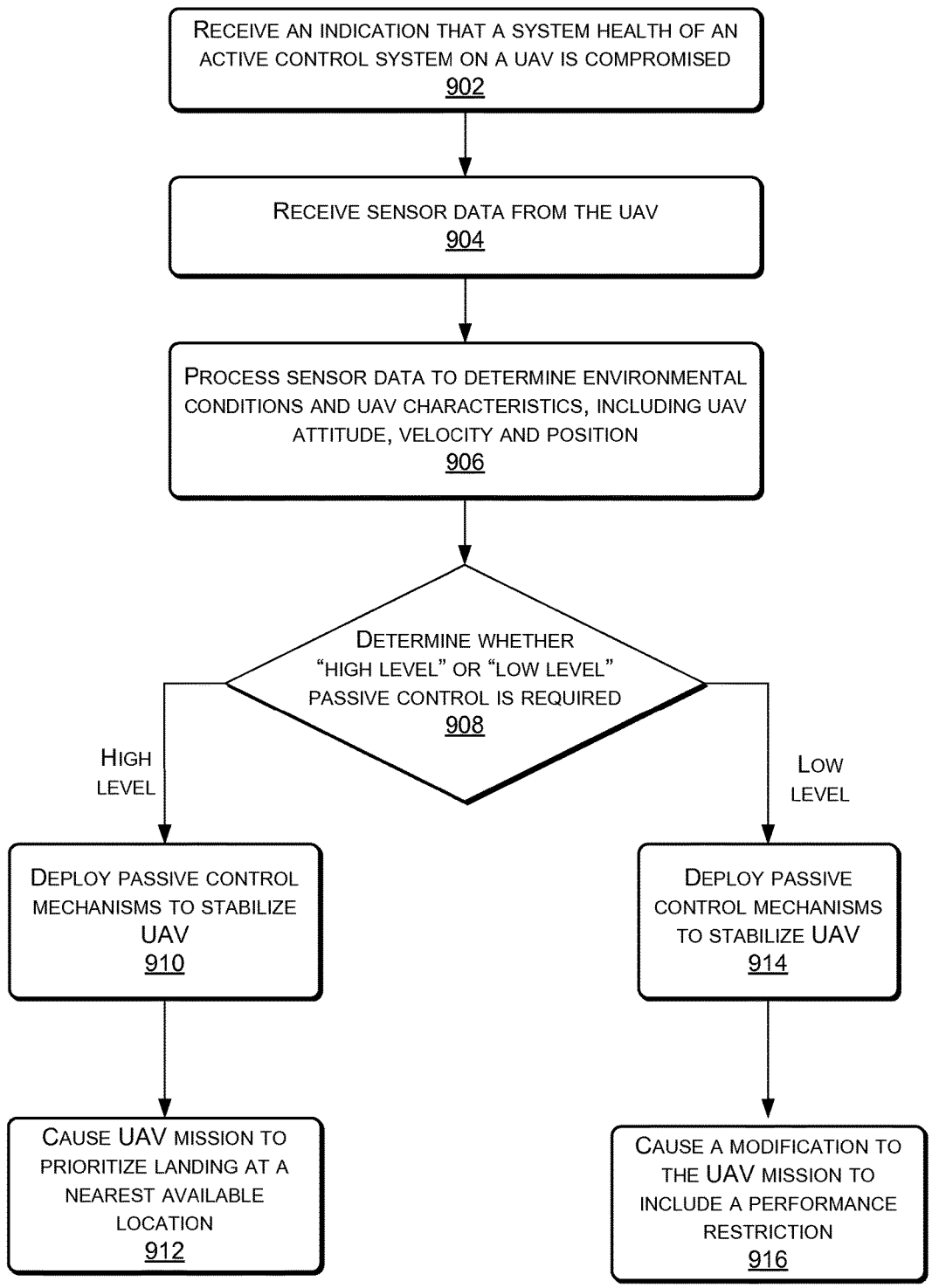
FIG. 9 is a flow diagram of a passive control system implementing a "high level" passive control or a "low level" passive control in response to receiving an indication of a compromised system health condition of an active control system.

FIG. 9 is a flow diagram of a passive control system implementing a "high level" passive control or a "low level" passive control in response to receiving an indication that a system health of an active control system has been compromised. In some examples, a "high level" passive control can be associated with a UAV configuration that requires significant stabilization and can be associated with turbulent weather conditions or a significant compromise in system health of an active control system. In contrast, a "low level" passive control can be associated with a UAV configuration that requires some stabilization, but does not significantly impede on maneuverability.

At 902, the passive control system may receive an indication that a system health of an active control system of a UAV has been compromised. In various examples, the passive control system may receive the indication from the active control system itself. In other examples, the passive control system may additionally, or alternatively, continuously monitor in-flight data of a UAV to independently detect a compromised system health condition of the active control system.

At 904, the passive control system may receive sensor data from one or more sensors of the UAV. In various examples, the sensor data can be sourced from sensors installed the UAV. In some examples, UAV sensors include an altimeter, gyroscope, GPS sensor, pitot static tube and one or more accelerometers.

At 906, the passive control system may process the sensor data to determine environmental conditions surrounding the UAV, and UAV characteristics including attitude, velocity, and position. In various examples, sensor data from two or more sensor types can be combined to determine an environmental condition or a UAV characteristic.

At 908, the passive control system determines whether the UAV requires "high level" passive control or "low level" passive control. In various examples, "high-level" passive control pertains to a UAV configuration that lacks sufficient maneuverability to complete its original delivery or task. Instead, the task of the UAV is re-prioritized to land at the nearest available location. Alternatively, "low level" passive control pertains to a passively controlled UAV configuration that retains sufficient maneuverability to complete its original delivery or task.

At 910, the passive control system determines that a "high level" passive control can stabilize the UAV. In response, the passive control system can deploy one or more passive controls such as lowering one or more structures of the UAV to increase an offset between a center of thrust and a center of gravity of the UAV to provide pendulum stability. Further, the passive control system may also deploy one or more spin-brake or airbrake control surfaces to impede a spin and reduce a horizontal motion of the UAV respectively.

At 912, the passive control system can further cause the UAV to land at the nearest available location and forgo its original delivery or task. In some examples, a change in task can be implemented in response to reduced maneuverability of the passive UAV configuration.

At 914, the passive control system can determine that a "low level" passive control can stabilize the UAV. In response, the passive control system can move ballast to outermost positions, or deploying one or more spin-brake control surfaces that act to impede a rotational spin of the UAV. Since a "low level" passive control is a minor stability disruption to the UAV, the UAV may retain sufficient maneuverability to complete its original delivery or task.

At 916, the passive control system can cause a modification the UAV delivery or task to include a performance modification. In various examples, a performance modification may include a reduction in permitted velocity, or a reduction in cruise altitude. In some examples, a performance modification may be imposed as a precautionary measure to ensure that any unintended environmental conditions do not negatively affect the deployed passive control mechanisms.

Figure 10:
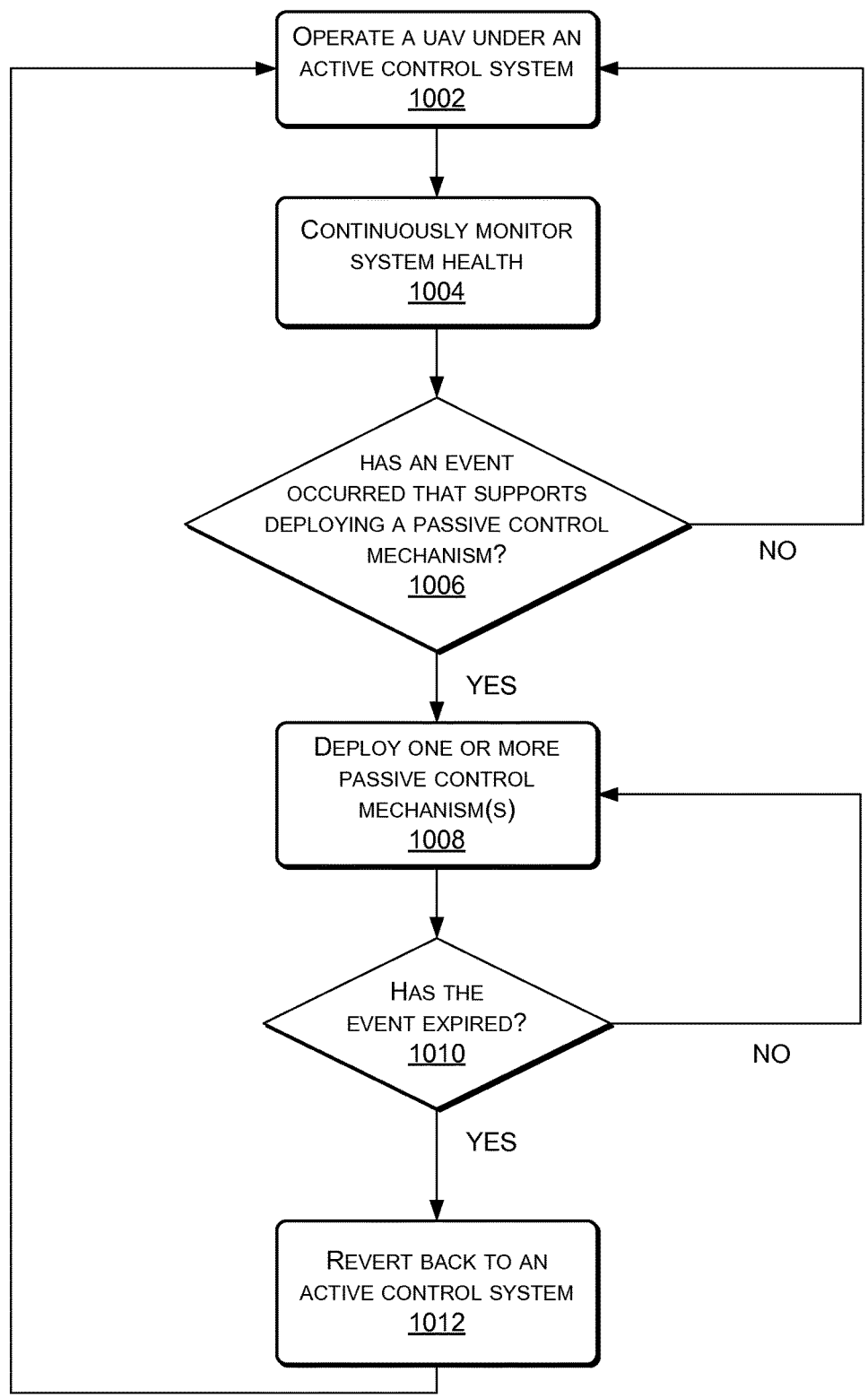
FIG. 10 is a flow diagram that illustrates a UAV changing between an active control system and a passive control system.

FIG. 10 is a flow diagram that illustrates a change in flight control on a UAV from an active control system to a passive control system. FIG. 9 further illustrates an embodiment of a UAV reverting back to an active control system from a passive control system. In some examples, the following flow and change between an active control system and a passive control system can be initiated and controlled by a passive control system on a UAV. In other examples, the following flow and change between an active control system and a passive control system can be initiated and controlled by a central controller that is independent of, but communicatively coupled to the UAV passive control system.

At 1002, a UAV can operate under an active control system. Under normal operating condition, an active control system can continuously monitor the UAV attitude, velocity, and position, and apply micro-corrections to thrust and control surface orientations to maintain a continuous stable flight.

At 1004, the passive control system can monitor sensor data of the UAV can be continuously monitored to validate stable flight. In a non-limiting example, the sensor data can be received from one or more UAV sensors including an altimeter, gyroscope, pitot static tube, GPS sensor, and one or more accelerometers. In some examples, the sensor data from a combination of the one or more sensors can be used to determine a UAV attitude, velocity, and position.

At 1006, the passive control system can determine whether an event has occurred that supports deploying a passive control mechanism. In various examples, an event may include, but is not limited to, an indication of a component failure on an active control system, an indication of unstable flight characteristics, an indication of bad weather conditions, or a loss of a communicative connection between the UAV and a central controller. In other examples, an event may be based on a flight plan of the UAV, and include a flight plan segment that does not require a continuous monitoring of stable flight characteristics. In a non-limiting example, a flight plan segment may include a cruise segment over unpopulated terrain. An advantage of deploying a passive control mechanism based on a flight plan may be to conserve energy resources. In response to determining that an event has not occurred, the UAV may continue flight operations under an active control system.

At 1008, in response to determining that an event has occurred, the passive control system can deploy one or more passive control mechanism. In various examples, the one or more passive control mechanisms can include lowering support structure of the UAV to increase an offset between a UAV center of thrust and a center of gravity, deploying one or more air-brake control surfaces, or deploying spin-brake control surfaces.

At 1010, the passive control system can determine whether the event that caused the deployment of the passive control mechanisms has expired. In various examples, an expiring event may include, but is not limited to, receiving an indication of improved weather conditions, regaining stable flight characteristics, and receiving an indication of an end of a particular flight plan segment. In response to determining that an event has not expired, the UAV may continue flight with passive control mechanisms deployed.

At 1012, in response to determining that an event has expired, the passive control system can revert back to an active control system from a passive control system. For example, in the event that the support structure of the UAV is lowered to offset the center of gravity from the center thrust, the UAV can only revert back to an active control system by raising the support structure. In some examples, raising the support structure may require a motor-driven spool that can wind the cords coupled to the support structure.

Further, in response to determining that the UAV is configured to revert back to an active control system, the passive control system can cause the passive control mechanisms to retract, and revert control back to an active control system of the UAV.

CONCLUSION

Although the subject matter has been described in language specific to structural features and/or methodological acts, it is to be understood that the subject matter defined in the appended claims is not necessarily limited to the specific features or acts described herein. Rather, the specific features and acts are disclosed as illustrative forms of implementing the claims.

What is claimed:
1. An Unmanned Aerial Vehicle (UAV), comprising:
an airframe to support a propulsion system of the UAV;
a support structure that is coupled to the airframe via a coupling structure, the coupling structure comprising a first release mechanism and one or more cords, the first release mechanism selectively coupling an underside of the airframe that is proximate to an upper-side of the support structure, and wherein a first end of individual cords of the one or more cords is coupled to the underside of the airframe and a second end of the individual cords is coupled to the upper-side of the support structure, the individual cords to couple to the support structure under the airframe at a predetermined offset distance in response to release of the first release mechanism;
one or more control surfaces coupled to the airframe, the one or more control surfaces being maintained in a stowed state prior to deployment by activation of a second release mechanism, the one or more control surfaces to translate from the stowed state to a deployed state where the one or more control surfaces protrude into an airstream and provide the UAV with at least some rotational stability caused by air drag;
one or more sensors distributed throughout the airframe and the support structure, the one or more sensors configured to monitor at least an orientation and velocity of the UAV;
a controller coupled to the support structure, the controller comprising a passive control system to selectively deploy at least one of the first release mechanism or the second release mechanism, the controller further comprising:
one or more processors;
memory coupled to the one or more processors, the memory including computer executable instructions that are executable by the one or more processors to perform functions of at least the passive control system, the functions to:
receive sensor data from the one or more sensors of the UAV;

determine a lateral stability and rotational stability of the UAV based at least in part on the sensor data, wherein the lateral stability is determined by a frequency of oscillation about a horizontal axis of the UAV, and wherein the rotational stability is determined by an angular acceleration of the UAV about a vertical axis of the UAV;

cause the first release mechanism to uncouple, based at least in part on determining that the UAV is laterally unstable, to cause the support structure to be supported by the individual cords coupled to the airframe; or cause the second release mechanism to uncouple, based at least in part on determining that the UAV is rotationally unstable, to cause the one or more control surfaces to move from the stowed state to the deployed state.

2. The UAV of claim 1, the memory further storing computer executable instructions that, when executed causes the one or more processors to perform functions to:

monitor sensor data from the one or sensors of the UAV;

process the sensor data as processed sensor data to indicate an orientation, velocity, and a geo-location of the UAV; and determine that a system health of an active control system for the UAV has been compromised, based at least in part on the processed sensor data, wherein to determine a lateral stability and rotational stability of the UAV is further based at least in part on determining that the system health of the active control system has been compromised.

3. The UAV of claim 1, wherein the one or more control surfaces are coupled to an underside surface of the airframe, and wherein the stowed state of the one or more control surfaces further comprises a control surface position that is oriented to nest alongside the underside surface of the airframe; and further comprising:

one or more additional control surfaces coupled to an upper-side surface of the airframe, the one or more additional control surfaces oriented to nest alongside the upper-side surface of the airframe prior to deployment by activation of a third release mechanism, the one or more additional control surfaces to translate from alongside the upper-side surface of the airframe to a corresponding deployed state.

4. The UAV of claim 1, wherein the coupling structure further comprises one or more spools, the one or more spools being attached to the underside of the airframe, individual spools of the one or more spools winding the individual cords of the one or more cords; and wherein the memory of the controller further stores computer executable instructions that, when executed causes the one or more processors to perform functions to:

cause the individual spools to unwind the individual cords in response to determining that the UAV is laterally unstable.

5. A passive control system comprising:

one or more processors;

memory coupled to the one or more processors, the memory including one or more modules that are executable by the one or more processors to:

determine a stability profile of an Unmanned Aerial Vehicle (UAV) based at least in part on sensor data from the UAV, the stability profile including at least a rotational stability of the UAV, wherein the rotational stability is determined by an angular acceleration of the UAV about a vertical axis of the UAV;

cause, via a spring loaded device, a deployment of one or more control surfaces based at least in part on the stability profile, the deployment of one or more control surfaces to alter airflow relative to the UAV to stabilize the UAV; and determine a task modification for the UAV based at least in part on the deployment of one or more control surfaces, the task modification including at least one of a performance modification or a new target destination.

6. The passive control system of claim 5, wherein the stability profile of the UAV indicates that the UAV is rotationally unstable;

wherein the one or more control surfaces include one or more spin-brake control surfaces that are coupled to the UAV at a position that is offset from a vertical rotational axis of the UAV; and wherein to cause the deployment of the one or more control surfaces further comprises acts by the one or more processors to:

cause the one or more spin-brake control surfaces to deploy from a stowed position to a deployed position, the deployed position being where the one or more spin-brake control surfaces protrude into an airstream and provide the UAV with at least some rotational stability.

7. The passive control system of claim 5, wherein the one or more modules are further executable by the one or more processors to:

determine that a horizontal motion of the UAV is greater than a predetermined threshold based at least in part on the sensor data;

wherein the one or more control surfaces include air-brake control surfaces that are coupled to an upper-side surface of the UAV; and wherein the one or more modules of the passive control system are further executable by the one or more processors to cause the air-brake control surfaces to deploy from a stowed position to a deployed position based at least in part on the horizontal motion of the UAV being greater than the predetermined threshold.

8. The passive control system of claim 5, wherein the one or more modules are further executable by the one or more processors to:

cause one or more ballast weights to move from a centralized position within a support structure of the UAV to an outermost position, based at least in part on the stability profile.

9. The passive control system of claim 5, wherein to determine the task modification for the UAV further comprises acts by the one or more processors to:

determine the new target destination with the task modification, the new target destination being a geographic location that is proximate to a current location of the UAV.

10. The passive control system of claim 5, wherein the one or more modules are further executable by the one or more processors to determine that a system health of an active control system for an Unmanned Aerial Vehicle (UAV) has been compromised.

11. The passive control system of claim 10, wherein a compromised system health of the active control system comprises at least one of a diminished thrust output from one or more motors of the UAV that is left uncorrected by the active control system, a frequency of lateral oscillation about a horizontal axis of the UAV that is left uncorrected by the active control system, and an angular acceleration about a vertical axis of the UAV that is left uncorrected by the active control system.

12. The passive control system of claim 5, wherein the one or more modules are further executable by the one or more processors to:
   determine a direction and a magnitude of a crosswind that corresponds to a phase of flight of the UAV based at least in part on the sensor data; and
   wherein the performance modification associated with the task modification is based at least in part on the direction and the magnitude of the crosswind.

13. The passive control system of claim 5, wherein the one or more modules are further executable by the one or more processors to determine that a system health of an active control system has been compromised is based at least in part on receiving a transmission from the active control system that indicates that the system health of the active control system has been compromised.

14. An Unmanned Aerial Vehicle (UAV), comprising:
   an airframe to support a propulsion system;
   a support structure that is coupled to the airframe via a coupling structure, the coupling structure comprising a release mechanism and one or more cords, the release mechanism selectively coupling an underside of the airframe that is proximate to an upper-side of the support structure, and wherein a first end of individual cords of the one or more cords is coupled to the underside of the airframe and a second end of the individual cords is coupled to the upper-side of the support structure, the individual cords to couple to the support structure under the airframe at a predetermined offset distance in response to release of the release mechanism;
   one or more sensors distributed throughout the airframe and the support structure, the one or more sensors configured to monitor an orientation and velocity of the UAV; and
   a controller coupled to the support structure, the controller comprising a passive control system to selectively deploy at least the first release mechanism, the controller further comprising:
      one or more processors;
      memory coupled to the one or more processors, the memory including computer executable instructions that are executable by the one or more processors to perform functions of at least the passive control system, the functions to:
      determine a stability profile of the UAV based at least in part on sensor data from the UAV, the stability profile including at least a lateral stability of the UAV, wherein the lateral stability is determined by a frequency of oscillation about a horizontal axis of the UAV;
      cause the release mechanism of the coupling structure to uncouple the support structure from the airframe based at least in part on determining that the UAV is laterally unstable.

15. The UAV of claim 14, wherein the passive control system is further configured to cause the one or more processor to perform acts to:
   determine a task modification the UAV based at least in part on a lowering of the support structure from the airframe, the task modification including at least one of a performance modification or a new target destination.

16. The UAV of claim 14, the one or more sensors include at least one an altimeter, a gyroscope, a pitot static tube, a global positioning system (GPS) sensor, and one or more accelerometers.

17. The UAV of claim 14, further comprising:
   an aerodynamic element that is configured lift at least a portion of the UAV, the aerodynamic element further configured to include an attachment point and to deploy from a compartment on a top surface of the UAV;
   an additional cord having a first end and a second end, the first end being coupled to the attachment point of the aerodynamic element, and the second end being coupled to the top surface of the UAV; and
   wherein the memory of the controller further stores computer executable instructions that, when executed causes the one or more processors to perform functions to cause the aerodynamic element to deploy from the compartment on the top surface of the UAV in response to determining that the UAV is laterally unstable.

18. The UAV of claim 17, wherein the aerodynamic element is at least one of a box-kite or a balloon.

19. The UAV of claim 14, further comprising:
   one or more spin-brake control surfaces coupled to an underside surface of the airframe, the one or more spin-brake control surfaces being stowed in a first position prior to deployment, the first position oriented to nest alongside the underside surface of the airframe;
   wherein the stability profile of the UAV further includes a rotational stability of the UAV, wherein the rotational stability is determined by an angular acceleration of the UAV about a vertical axis of the UAV; and
   wherein the memory of the controller further stores computer executable instructions that, when executed causes the one or more processors to perform functions to cause a deployment of the one or more spin-brake control surfaces based at least in part on the stability profile.

20. The UAV of claim 14, further comprising:
   one or more air-brake control surfaces coupled to an upper-side surface of the UAV, the one or more air-brake control surfaces being stowed in a first position prior to deployment, the first position oriented to nest alongside the upper-side surface of the UAV;
   wherein the stability profile of the UAV further includes a determination that a horizontal motion of the UAV is greater than a predetermined threshold; and
   wherein the memory of the controller further stores computer executable instructions that, when executed causes the one or more processors to perform functions to cause a deployment of the one or more air-brake control surfaces from the first position to a deployed position based at least in part on the stability profile, the deployed position being where the one or more air-brake control surfaces protrude into an airstream and provide the UAV with at least some additional drag force.

* * * * *